United States Patent
Thiele et al.

(10) Patent No.: US 7,856,281 B2
(45) Date of Patent: Dec. 21, 2010

(54) ON-LINE ADAPTIVE MODEL PREDICTIVE CONTROL IN A PROCESS CONTROL SYSTEM

(75) Inventors: Dirk Thiele, Austin, TX (US); Wilhelm K. Wojsznis, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 221 days.

(21) Appl. No.: 12/267,039

(22) Filed: Nov. 7, 2008

(65) Prior Publication Data

US 2009/0143872 A1 Jun. 4, 2009

Related U.S. Application Data

(62) Division of application No. 11/240,705, filed on Sep. 30, 2005, now Pat. No. 7,451,004.

(51) Int. Cl.
*G05B 13/02* (2006.01)

(52) U.S. Cl. .............................. 700/32; 700/28; 700/29; 700/30; 700/31; 700/37; 700/44; 700/45

(58) Field of Classification Search .................. 700/28, 700/29, 30, 31, 32, 37, 44, 45
See application file for complete search history.

(56) References Cited

U.S. PATENT DOCUMENTS 4,054,408 A 10/1977 Sheffield et al.

(Continued)

FOREIGN PATENT DOCUMENTS

EP 0 037 579 A2 10/1981

(Continued)

OTHER PUBLICATIONS

"DeltaV Predict and DeltaV PredictPro—Powerful Practical Model Predictive Control," Product data sheet, Jun. 2003.

(Continued)

*Primary Examiner*—Ronald D Hartman, Jr.
(74) *Attorney, Agent, or Firm*—Marshall, Gerstein & Borun LLP

(57) ABSTRACT

A method of creating and using an adaptive DMC type or other MPC controller includes using a model switching technique to periodically determine a process model, such as a parameterized process model, for a process loop on-line during operation of the process. The method then uses the process model to generate an MPC control model and creates and downloads an MPC controller algorithm to an MPC controller based on the new control model while the MPC controller is operating on-line. This technique, which is generally applicable to single-loop MPC controllers and is particularly useful in MPC controllers with a control horizon of one or two, enables an MPC controller to be adapted during the normal operation of the process, so as to change the process model on which the MPC controller is based to thereby account for process changes. The adaptive MPC controller is not computationally expensive and can therefore be easily implemented within a distributed controller of a process control system, while providing the same or in some cases better control than a PID controller, especially in dead time dominant process loops, and in process loops that are subject to process model mismatch within the process time to steady state.

31 Claims, 5 Drawing Sheets

U.S. PATENT DOCUMENTS

| | | |
|---|---|---|
| 4,054,780 A | 10/1977 | Bartley et al. |
| 4,349,869 A | 9/1982 | Prett et al. |
| 4,358,822 A | 11/1982 | Sanchez et al. |
| 4,616,308 A | 10/1986 | Morshedi et al. |
| 4,641,235 A | 2/1987 | Shigemasa et al. |
| 4,736,316 A | 4/1988 | Wallman |
| 4,912,624 A | 3/1990 | Harth et al. |
| 5,018,215 A | 5/1991 | Nasr et al. |
| 5,043,863 A | 8/1991 | Bristol et al. |
| 5,159,547 A | 10/1992 | Chand |
| 5,159,562 A | 10/1992 | Putman et al. |
| 5,180,896 A | 1/1993 | Gibby et al. |
| 5,216,593 A | 6/1993 | Dietrich et al. |
| 5,268,835 A | 12/1993 | Miyagaki et al. |
| 5,272,621 A | 12/1993 | Aoki et al. |
| 5,283,729 A | 2/1994 | Lloyd |
| 5,301,101 A | 4/1994 | MacArthur et al. |
| 5,329,443 A | 7/1994 | Bonaquist et al. |
| 5,335,164 A | 8/1994 | Gough, Jr. et al. |
| 5,347,446 A | 9/1994 | Iino et al. |
| 5,351,184 A | 9/1994 | Lu et al. |
| 5,353,207 A | 10/1994 | Keeler et al. |
| 5,384,698 A | 1/1995 | Jelinek |
| 5,386,373 A | 1/1995 | Keeler et al. |
| 5,408,406 A | 4/1995 | Mathur et al. |
| 5,453,925 A | 9/1995 | Wojsznis et al. |
| 5,457,625 A | 10/1995 | Lim et al. |
| 5,461,559 A | 10/1995 | Heyob et al. |
| 5,477,449 A | 12/1995 | Iino et al. |
| 5,517,424 A | 5/1996 | Marcelle et al. |
| 5,521,814 A | 5/1996 | Teran et al. |
| 5,537,310 A * | 7/1996 | Tanake et al. .................. 700/31 |
| 5,539,638 A | 7/1996 | Keeler et al. |
| 5,548,528 A | 8/1996 | Keeler et al. |
| 5,559,690 A | 9/1996 | Keeler et al. |
| 5,561,599 A | 10/1996 | Lu |
| 5,568,378 A | 10/1996 | Wojsznis |
| 5,572,420 A | 11/1996 | Lu |
| 5,574,638 A | 11/1996 | Lu |
| 5,586,221 A | 12/1996 | Isik et al. |
| 5,587,897 A | 12/1996 | Iida |
| 5,587,899 A | 12/1996 | Ho et al. |
| 5,594,858 A | 1/1997 | Blevins |
| 5,625,552 A | 4/1997 | Mathur et al. |
| 5,659,467 A | 8/1997 | Vickers |
| 5,659,667 A | 8/1997 | Buescher et al. |
| 5,673,368 A | 9/1997 | Broese et al. |
| 5,680,304 A | 10/1997 | Wang et al. |
| 5,680,409 A | 10/1997 | Qin et al. |
| 5,682,309 A | 10/1997 | Bartusiak et al. |
| 5,682,317 A | 10/1997 | Keeler et al. |
| 5,696,696 A | 12/1997 | Gunther et al. |
| 5,704,011 A | 12/1997 | Hansen et al. |
| 5,727,128 A | 3/1998 | Morrison |
| 5,740,033 A | 4/1998 | Wassick et al. |
| 5,748,467 A | 5/1998 | Qin et al. |
| 5,758,047 A | 5/1998 | Lu et al. |
| 5,781,432 A | 7/1998 | Keeler et al. |
| 5,825,646 A | 10/1998 | Keeler et al. |
| 5,838,563 A | 11/1998 | Dove et al. |
| 5,838,595 A | 11/1998 | Sullivan et al. |
| 5,841,652 A | 11/1998 | Sanchez |
| 5,842,189 A | 11/1998 | Keeler et al. |
| 5,859,773 A | 1/1999 | Keeler et al. |
| 5,873,251 A | 2/1999 | Iino |
| 5,877,954 A | 3/1999 | Klimasauskas et al. |
| 5,886,895 A | 3/1999 | Kita et al. |
| 5,920,478 A | 7/1999 | Ekblad et al. |
| 5,933,345 A | 8/1999 | Martin et al. |
| 5,970,430 A | 10/1999 | Burns et al. |
| 6,041,320 A | 3/2000 | Qin et al. |
| 6,047,221 A | 4/2000 | Piche et al. |
| 6,049,738 A | 4/2000 | Kayama et al. |
| 6,055,483 A | 4/2000 | Lu |
| 6,056,781 A | 5/2000 | Wassick et al. |
| 6,064,809 A | 5/2000 | Braatz et al. |
| 6,079,205 A * | 6/2000 | Yasui et al. .................. 60/276 |
| 6,122,555 A | 9/2000 | Lu |
| 6,207,936 B1 | 3/2001 | de Waard et al. |
| 6,215,907 B1 | 4/2001 | Kumar et al. |
| 6,249,712 B1 | 6/2001 | Boiquaye |
| 6,253,113 B1 | 6/2001 | Lu |
| 6,266,605 B1 * | 7/2001 | Yasui et al. ................. 701/109 |
| 6,269,274 B1 | 7/2001 | Steinman et al. |
| 6,278,899 B1 | 8/2001 | Piche et al. |
| 6,298,454 B1 | 10/2001 | Schleiss et al. |
| 6,319,362 B1 | 11/2001 | Huhtelin et al. |
| 6,328,851 B1 | 12/2001 | Huhtelin et al. |
| 6,330,483 B1 | 12/2001 | Dailey |
| 6,336,050 B1 | 1/2002 | Amin et al. |
| 6,360,131 B1 | 3/2002 | Cheng |
| 6,373,033 B1 | 4/2002 | de Waard et al. |
| 6,381,505 B1 | 4/2002 | Kassmann et al. |
| 6,438,430 B1 | 8/2002 | Martin |
| 6,445,963 B1 | 9/2002 | Blevins et al. |
| 6,453,308 B1 | 9/2002 | Zhao et al. |
| 6,484,133 B1 | 11/2002 | Vogt |
| 6,487,459 B1 | 11/2002 | Martin et al. |
| 6,493,596 B1 | 12/2002 | Martin et al. |
| 6,493,601 B1 | 12/2002 | Wells et al. |
| 6,542,782 B1 | 4/2003 | Lu |
| 6,577,908 B1 | 6/2003 | Wojsznis et al. |
| 6,577,916 B1 | 6/2003 | Gehr et al. |
| 6,594,530 B1 | 7/2003 | Glanzer et al. |
| 6,611,737 B1 | 8/2003 | El-Tahan et al. |
| 6,615,090 B1 | 9/2003 | Blevins et al. |
| 6,625,501 B2 | 9/2003 | Martin et al. |
| 6,678,668 B2 | 1/2004 | Fisher et al. |
| 6,681,155 B1 | 1/2004 | Fujita et al. |
| 6,701,223 B1 | 3/2004 | Rachford, Jr. et al. |
| 6,714,899 B2 | 3/2004 | Kassmann |
| 6,721,609 B1 | 4/2004 | Wojsznis et al. |
| 6,735,483 B2 | 5/2004 | Martin |
| 6,745,088 B2 * | 6/2004 | Gagne ........................ 700/29 |
| 6,772,019 B2 | 8/2004 | Karas |
| 6,826,521 B1 | 11/2004 | Hess et al. |
| 6,901,300 B2 | 5/2005 | Blevins et al. |
| 6,954,713 B2 | 10/2005 | Eryurek |
| 6,993,396 B1 | 1/2006 | Gerry |
| 7,016,779 B2 | 3/2006 | Bowyer |
| 7,043,409 B1 | 5/2006 | Schaffler et al. |
| 7,050,880 B2 * | 5/2006 | de Roover et al. .......... 700/121 |
| 7,272,454 B2 | 9/2007 | Wojsznis et al. |
| 7,395,124 B2 * | 7/2008 | Schmidt et al. ................ 700/29 |
| 7,451,004 B2 | 11/2008 | Thiele et al. |
| 2002/0016640 A1 | 2/2002 | Gagne |
| 2002/0103548 A1 | 8/2002 | Treiber et al. |
| 2003/0120361 A1 | 6/2003 | Anderson et al. |
| 2003/0139825 A1 | 7/2003 | Lund |
| 2003/0195641 A1 | 10/2003 | Wojsznis et al. |
| 2004/0049299 A1 | 3/2004 | Wojsznis et al. |
| 2004/0117766 A1 | 6/2004 | Mehta et al. |
| 2004/0181300 A1 | 9/2004 | Clark et al. |
| 2005/0209714 A1 | 9/2005 | Rawlings et al. |
| 2007/0078529 A1 * | 4/2007 | Thiele et al. .................. 700/29 |

FOREIGN PATENT DOCUMENTS

| | | |
|---|---|---|
| EP | 0 524 317 A1 | 1/1993 |
| EP | 0 588 594 A2 | 3/1994 |
| EP | 0 643 344 A1 | 3/1995 |
| EP | 1 600 322 | 1/2005 |
| GB | 1 355 545 | 6/1974 |
| GB | 2 186 715 A | 8/1987 |

| | | |
|---|---|---|
| GB | 2 394 312 A | 4/2004 |
| GB | 2 394 313 A | 4/2004 |
| GB | 2 430 764 | 4/2007 |
| WO | WO-97/12300 A2 | 4/1997 |
| WO | WO-00/33209 A2 | 6/2000 |
| WO | WO-01/98845 A1 | 12/2001 |

OTHER PUBLICATIONS

Babb, "Fast Computers Open the Way for Advanced Controls," *Control Engineering*, Jan. 1991.

Bitton et al., "Feasibility and Performance Study of Dependency Inference [database design]," Data Engineering, 1989. Proceedings. Fifth International Conference on, Feb. 6-10, 1989 pp. 635-641.

Brochure entitled "Advanced Control and Optimization, Capturing and Sustaining Maximum Client Benefits" from Aspen Technology, Inc. of Cambridge, MA, copyright 1996.

Chmelyk, "An Integrated Approach to Model Predictive Control of an Industrial Lime Kiln," *NORPAC Controls Ltd*.

Cutler et al., "Dynamic Matrix Control—A Computer Control Algorithm," *Proceedings of the Joint Automatic Control Conference*, 1980.

Dabrowski et al., "Design of Switched-Capacitor FIR Filters with Application to a Low-Power MFSK Receiver," Circuits, Devices and Systems, IEE Proceedings G, vol. 139, Issue: 4, Aug. 1992 pp. 450-466.

De Keyser et al., "A Comparative Study of Self-Adaptive Long-Range Predictive Control Methods," *Automatica*, vol. 24, No. 2, pp. 149-163, 1988.

Dynamic Matrix Corporation, "DMC Multivariable Model Predictive Constraint Control."

Edgar et al., "Optimization of Chemical Processes," Chapter 7, McGraw-Hill, Inc., pp. 251-298 (1988).

Forrest et al., IBM System Journal, Mar. 1992, "Implementing Interior Point Linear Programing Methods in the Optimization Subroutine Library—Technical."

Froisy, "Model Predictive Control: Past, Present and Future," 33 ISA Transactions pp. 235-243 (1994).

Garcia et al., "Model Predictive Control: Theory and Practice—a Survey," *Automatica*, vol. 25, No. 3, pp. 335-348, 1989.

Garcia et al., "Quadratic Programming Solution of Dynamic Matrix Control (QDMC)," *Chemical Engineering Communications*, 46:73-87, 1986.

Gschwendtner et al., "Adaptive Propagation Modeling Based on Neural Network Techniques," Fellow, IEEE, 1996 IEEE.

Hanagud et al., "Artificial Intelligence-Based Model-Adaptive Approach to Flexible Structure Control," *American Institute of Aeronautics and Astronautics, Inc.*, vol. 13, pp. 534-544 (1990).

Hoffman et al., "Model Predictive Control: Future Requirements and Trends," ISA, 1993, Paper #93-369, pp. 1241-1247 (Oct. 1993).

Honeywell Hi-Spec Solutions: "Honeywell's RMPCT—A Breakthrough in Process Control Technology" Frequently Asked Questions.

Huang et al., "100 Tap FIR/IIR Analog Linear-Phase Lowpass Filter Qiuting," VLSI Circuits, 1995. Digest of Technical Papers., 1995 Symposium on, Jun. 8-10, 1995 pp. 91-92.

Huang, "Mixed Analog/Digital, FIR/IIR Realization of a Linear-Phase Lowpass Filter," Solid-State Circuits, IEEE Journal of, vol. 31, Issue: 9, Sep. 1996 pp. 1347-1350.

Lee et al., "State-space Interpretation of Model Predictive Control," *Automatica*, vol. 30, No. 4, pp. 707-717, 1994.

Lee et al., "Tuning of Model Predictive Controllers for Robust Performance," *Computers in Chemical Engineering*, vol. 18, No. 1, pp. 15-37, 1994.

Lynch at al., "An Object Oriented Intelligent Control Architecture," 1992 ACC/TP4, vol. 3, 92CH3072-6, Chicago.

MacArthur, "RMPCT: A New Robust Approach to Multivariable Predictive Control for the Process Industries," Proceedings of the 1996 Control Systems Conference, Halifax, Canada, 1996.

Maciejowski, "Model Predictive Control with Constraints," Pearson Education Limited, Appendix A, Appendix B, 2002.

McDonnell et al., "Predictive Functional Control of Multivariable Systems with more Outputs than Inputs," Proceedings 28 CDC, Orlando, Florida, 1989.

McMillian, "Process Control Optimization," slides entitled "Breaking Into Model Based Control" presented at Fisher-Rosemount Systems Advanced Control Seminar, San Antonio (Nov. 1997).

MDC Technology, "RTO Technical Presentation."

Microelectronics (Digital and Analog Circuits and Systems), Jacob Millman, Ph.D., Copyright © 1979 McGraw-Hill Inc.

Misra, "Auxiliary Variables Notes on UNITY" 15-90, UT Austin (1990).

Morari, et al., "Model Predictive Control Toolbox," Matlab® User's Guide, Version 1, The Math Works, Inc. 1995.

U.S. Appl. No. 09/412,078, dated Oct. 4, 1999, "Integrated Advanced Control Blocks in Process Control Systems."

U.S. Appl. No. 60/132,780, dated May 6, 1999, "Integrating Distributed Process Control System Functionality on a Single Computer."

Qin et al., "An Overview of Industrial Model Predictive Control Technology," AIChE Conference, pp. 1-31 (1996).

Rao et al., "Application of Interior-Point Methods to Model Predictive Control," *J. Optim. Theory Appl.*, 99:723-757, 1998.

Rawlings et al., "Model Predictive Control with Linear Models," *Process Systems Engineering*, vol. 39, No. 2, Feb. 1993.

Rumbaugh, "Let There Be Objects: A Short Guide to Reification," *Journal of Object-Oriented Programming*, vol. 5, No. 7, Nov./Dec. 1992.

Shridhar et al., "A Novel Tuning Strategy for Multivariable Model Predictive Control," *ISA Transactions*, vol. 36, No. 4, pp. 273-280, 1998.

Thiele et al., "Configuration and Viewing Display for an Integrated Model Predictive Control and Optimizer Function Block," U.S. Appl. No. 10/310,416, filed Dec. 5, 2002.

Thiele et al., "Simulation of Multivariable Model Predictive Control," in Proceedings of ISA 2001 Conference, Sep. 10-13, 2001, Houston, TX.

Thiele, "Benefits and challenges of implementing model predictive control as a function block," *Advances in Instrumentation and Control, ISA/2000 Conference*, Aug. 2000, New Orleans.

Wilhelm et al., "Advanced Process Control in Record Time," Control Magazine Software and Information Systems (May 1999).

Wilkins et al., "The Use of Adaptive Algorithms for Obtaining Optimal Electrical Shimming in Magnetic Resonance Imaging (MRI)," IEEE Transactions on Biomedical Engineering, vol. 36, No. 2, Feb. 1989, pp. 202-210.

Wojsznis et al., "Easy Robust Optimal Predictive Controller," Advances in Instrumentation and Control, ISA/2000 Conference, Aug. 2000, New Orleans.

Wojsznis et al., "Practical Approach to Tuning MPC," in Proceedings of ISA 2001 Conference, Sep. 10-13, 2001, Houston, TX.

Wojsznis et al., "Robust Predictive Controller in Object-Oriented Implementation," ISA, Paper No. 93-297, pp. 521-528, 1993.

Search Report for Application No. GB0619184.5, dated Jan. 23, 2007.

Chinese Office Action and English-language translation thereof for Application No. 200610131752.7, dated Sep. 25, 2009.

\* cited by examiner

ON-LINE ADAPTIVE MODEL PREDICTIVE CONTROL IN A PROCESS CONTROL SYSTEM

RELATED APPLICATION

This application is a divisional of U.S. patent application Ser. No. 11/240,705 filed Sep. 30, 2005, entitled "On-Line Adaptive Model Predictive Control in a Process Control System," the entire disclosure of which is hereby incorporated by reference herein.

FIELD OF TECHNOLOGY

The present invention relates generally to process control systems and, more particularly, to the creation and use of an on-line adaptive model predictive controller or other model predictive control type controller within a process control system.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single control output used to control a single process input, such as a valve position, etc. However, in certain cases, the use of a number of independently operating, single-input/single-output control loops is not very effective because the process variables being controlled are affected by more than a single process input and, in fact, each process input may affect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired (set point) values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby affecting the temperature and causing the temperature control loop to take some other action. As will be understood in this example, the single-input/single-output control loops cause the process outputs (in this case, throughput, temperature and pressure) to behave in an unacceptable manner wherein the outputs oscillate without ever reaching a steady state condition.

Model predictive control (MPC) or other types of advanced control which use dynamic matrix control (DMC) techniques have been used to perform process control in situations in which changes to a particular controlled process variable affects more than one process variable or output. Since the late 1970s, many successful implementations of model predictive control have been reported and MPC has become the primary form of advanced multivariable control in the process industry. Still further, MPC control has been implemented within distributed control systems as distributed control system layered software. U.S. Pat. Nos. 4,616,308 and 4,349,869 generally describe MPC controllers that can be used within a process control system.

Generally speaking, MPC is a multiple-input/multiple output control strategy in which the effects of changing each of a number of process inputs (i.e., manipulated variables) on each of a number of process outputs (i.e., controlled variables) is measured and these measured responses are then used to create a control matrix for use in controlling the process. The control matrix includes a process model (which generally defines the dynamic operation of the process) which must be inverted mathematically and then used in or as a multiple-input/multiple-output controller to control the process outputs based on changes made to the process inputs. In some cases, the process model is represented as a process output response curve (typically a step response curve) for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, MPC is described generally in Qin, S. Joe and Thomas A. Badgwell, "An Overview of Industrial Model Predictive Control Technology," *AIChE Conference*, 1996.

While MPC is useful in many process control situations, MPC applied in the industry predominantly uses a dynamic matrix control (DMC) technique that requires generation of a typically complex process model (typically mathematically represented as a recursive algorithm or a matrix calculation) and then subsequent inversion of that model to create the control matrix used in the MPC controller. As a result, generating the MPC controller is computationally expensive. Still further, in order to develop an accurate process model for use in creating an MPC controller, it has traditionally been necessary to disturb or upset the process with known control signals, e.g., step signals, for each of the control inputs and determine the reaction of each of the process variables or controlled variables to the known changes in the control inputs. One way of implementing this procedure in a distributed process control system is described in more detail in U.S. Pat. No. 6,721,609, entitled "Integrated Optimal Model Predictive Control in a Process Control System", the disclosure of which is hereby incorporated herein.

While this process disturbance technique generally produces a highly accurate process model, the disturbance procedure takes time and upsets the normal operation of the process and is thus difficult if not practically impossible to perform when a process is running on line. Instead, this process disturbance technique typically needs to be implemented on the process when the process is not operating to create an actual product, e.g., during the initial configuration of the process or the MPC controller. Of course, this constraint severely limits the times during which a process model can be determined. In any event, this technique is not suitable for use in an adaptive MPC controller (i.e., one in which the MPC control matrix is changed during the on-line operation of the process) as it requires process upset during each adaptive cycle. Furthermore, this method is computationally expensive for MPC controllers of any significant size (i.e., those having multiple inputs and multiple outputs) as the control matrix must be inverted and applied after determining a new process model. This computational load makes it difficult to implement adaptive MPC in distributed process controllers, which are typically limited in the amount of additional computational load that can be performed in conjunction with performing on-line process control activities.

However, in many situations, it is desirable to adapt the MPC controller during operation of the process to account for process model mismatch. In particular, when implementing MPC, the process model determined at the configuration stage only reflects the process at the time that the process model was created. Any subsequent changes in the process, which changes typically occur naturally during the course of running a process, will not be reflected in the process model used by the MPC controller and may therefore lead to model mismatch and non-optimal control by the MPC controller. MPC controllers are most susceptible or sensitive to modeling errors in the dead time of the process loop. In many control situations, it is desirable and sometimes necessary to compensate for this model mismatch.

In the past, one method used to compensate for model mismatch in a DMC or other MPC controller was to periodically create a new process model and generate a new control model and controller using the process upset or disturbance technique. However, as described above, this procedure could only be performed infrequently and computation has to be performed off-line due to the need to perform process upset to determine a new process model and due to the amount of computations needed to be performed during the controller matrix generation process. Another manner of compensating for model mismatch for non-linear processes is described in U.S. patent application Ser. No. 10/454,937, entitled "Multiple-Input/Multiple-Output Control Blocks with Non-Linear Predictive Capabilities," which uses a non-linear process model in conjunction with an MPC controller generated using a process upset technique. Generally speaking, this technique compares predicted process changes developed using a non-linear process model and predicted process changes developed from the MPC process model to create error signals indicative of the model mismatch, and then uses these error signals to compensate for non-linear characteristics of the process which were not accounted for or modeled when generating the MPC controller. However, this technique relies on the use of a complex non-linear process model to accurately reflect the process operation and to create appropriate compensation signals for the MPC controller. Additionally, in many cases, there may still be model mismatch between the non-linear process model and the actual process, which can lead to poorer control performance. Still further, this technique is not adaptive, as neither the non-linear process model nor the MPC process model is changed during the on-line operation of the controller.

Partially as a result of the difficulty in creating and implementing an effective adaptive MPC controller or other type of adaptive DMC controller, the art of process control uses adaptive PID controllers in many process situations in which the process model changes frequently during operation of the process. While adaptive PID controllers are well known and are applied to adapt during the operation of a process, these PID controllers, to operate satisfactorily, must be detuned or tuned very conservatively in dead time dominant processes, which leads to poor performance. Still further, PID controllers are highly susceptible to poor control performance when there is a mismatch between the controller reset and the actual process time constant, especially when the process dynamics change frequently. Unfortunately, determining the process time constant (which is directly related to the process time to steady state) is the most uncertain parameter developed when using known process model identification methods. Thus, PID controllers are not necessarily the best choice when controlling a dead time dominant process, especially when the time to steady state of the process changes frequently.

SUMMARY

A method of creating and using an adaptive DMC or other MPC controller includes using a model switching technique to periodically determine a process model, for example, a parameterized process model, for a process loop on-line during operation of the process, without having to artificially excite the process. The method then uses the process model to generate an MPC control model and creates an MPC controller algorithm on-line, i.e., while the process in executing normally. This technique, which is generally applicable to single-loop MPC controllers and is particularly useful in MPC controllers with a control horizon of one or two, enables an MPC controller to be adapted on-line, i.e., during the normal operation of the process, to change the process model on which the MPC controller is based and to thereby account for changes in the process over time. Such an adaptive MPC controller is not computationally expensive and can therefore be easily implemented within a distributed controller of a process control system while providing the same or in some cases better control than a PID controller. More particularly, it has been found that an adaptive, single-loop MPC controller with a small control horizon, e.g., one or two, can provide better control than a PID controller in dead time dominant loops, and especially in cases in which the process loops are subject to process model mismatch due to changes in the process dynamics. Additionally, an MPC controller can accommodate easily more than one feedforward input usually not available in PID controllers.

DETAILED DESCRIPTION

Figure 1:
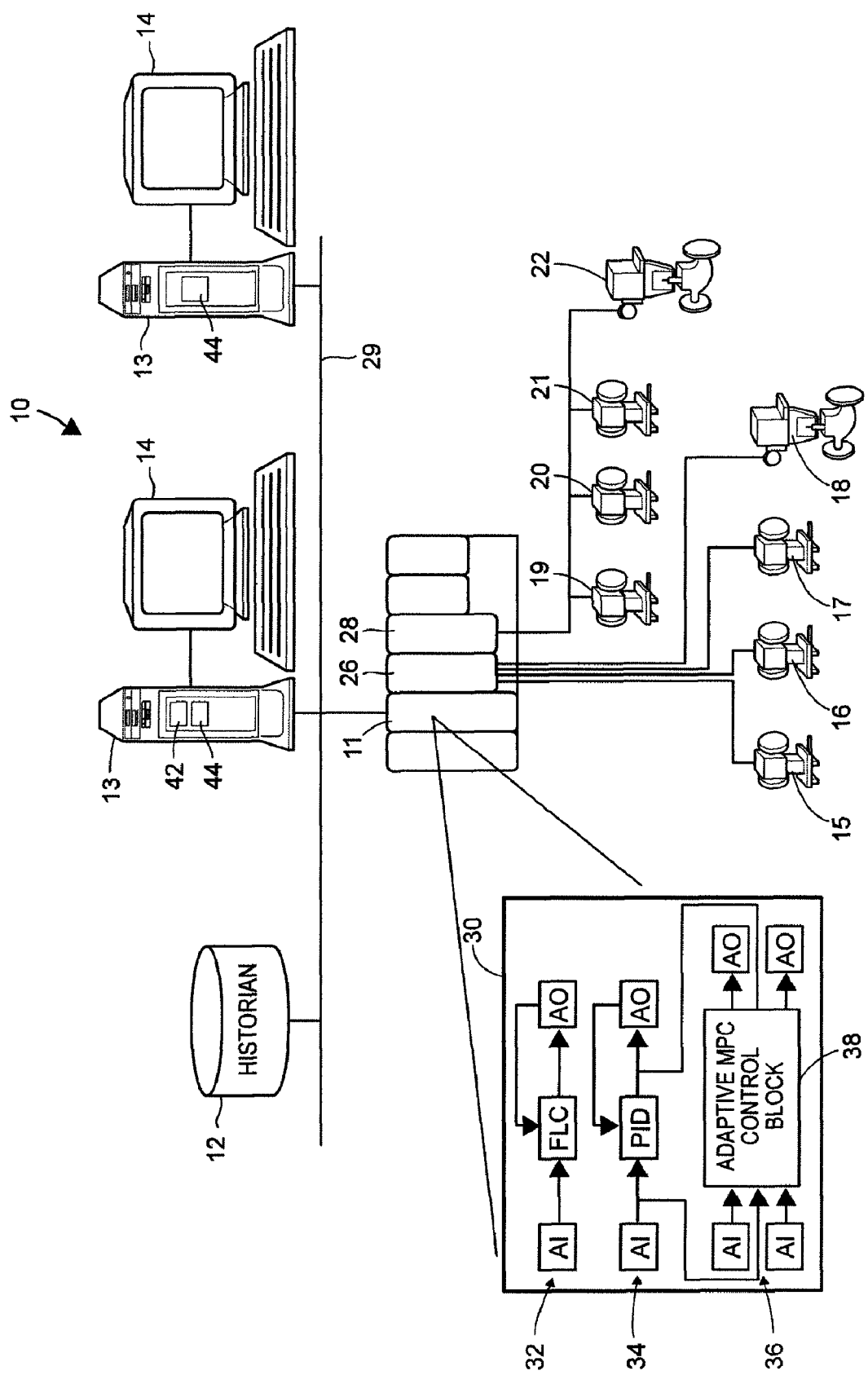
FIG. 1 is a block diagram of a process control system including a control module having an adaptive DMC controller function block, such as an adaptive MPC controller function block, for controlling one or more process loops.

Referring now to FIG. 1, a process control system 10 includes a process controller 11 (which may be a distributed process controller) communicatively connected to a data historian 12 and to one or more host workstations or computers 13 (which may be any type of personal computers, workstations, etc.), each having a display screen 14, a memory and a processor (not shown). The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Emerson Process Management, is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION® Fieldbus protocol (Fieldbus), the HART protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog or analog/digital lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11, which may be one of many distributed controllers within the plant 10 having at least one processor therein, implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software, hardware, or firmware programming or design tools. As a result, the controller 11 may be configured to implement a control strategy or control routine in any desired manner.

In one embodiment, the controller 11 implements a control strategy using what are commonly referred to as function blocks, wherein each function block is a part or object of an overall control routine and operates in conjunction with other function blocks (via communications called links) to implement various process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may include a number of traditional single-loop control routines, illustrated as routines 32 and 34, and may implement one or more adaptive DMC type control loops, illustrated as control loop 36. Each such traditional or DMC type control loop is typically referred to as a control module. The control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other devices within the process control system 10. The adaptive DMC type control loop 36, which will be described in more detail as an adaptive MPC control loop, is illustrated as including an adaptive MPC control block 38 having inputs communicatively connected to one or more AI function blocks and outputs communicatively connected to one or more AO function blocks, although the inputs and outputs of the adaptive MPC control block 38 may be communicatively connected to any other desired function blocks or control elements to receive other types of inputs and to provide other types of control outputs. Still further, while the adaptive MPC control block 38 is illustrated in FIG. 1 as a multiple-input/multiple-output control block, it will be understood that this control block could instead be a single loop control block with a feedback control path and, if desired with a feedforward control path.

As will be described in more detail, the adaptive MPC control block 38 is a control block that monitors the process and that re-calculates a process model, such as a parameterized process model, for the process (or at least the portion or loop of the process being controlled by the control block 38) on-line, during operation of the process. The adaptive MPC control block 38 then uses the new process model, whenever determined, to recalculate the MPC control model and the MPC control algorithm used within the control block 38, to thereby adapt the MPC controller within the MPC control block 38 to better match or to control based on the newly calculated process model. This adaptive MPC control occurs without the need to artificially upset the process to determine the new process model and without having to take the process off-line to calculate and install the new MPC controller model and algorithm within the MPC controller. As will be understood, the process model can be re-defined and the MPC controller can be regenerated at various times during operation of the process to reduce or eliminate model mismatch between the MPC controller and the process due to changes in the process over time.

As noted above, while the adaptive control block 38 will be described herein as including a model predictive control (MPC) block, the control block 38 could implement other DMC type control techniques instead using the same principles described herein. Still further, it will be understood that the function blocks illustrated in FIG. 1, including the adaptive MPC control block 38, can be executed by the controller 11 or, alternatively, can be located in and executed by any other processing device, such as one of the workstations 13 or even one of the field devices 19-22.

As illustrated in FIG. 1, one of the workstations 13 includes an adaptive MPC configuration routine 40 that is used to create, download and implement the adaptive MPC control block 38 (or the control module 36 in which the control block 38 is located). While the adaptive MPC control block configuration routine 40 may be stored in a memory within the workstation 13 and executed by a processor therein, this routine (or any part thereof) may additionally or alternatively be stored in and executed by any other device within the process control system 10, if so desired. Generally speaking, the adaptive MPC configuration routine 40 includes a control block creation routine 42 that creates an adaptive MPC control block as described herein and that connects this adaptive MPC control block into the process control system. This creation and configuration routine may be integrated with or the be same routine which can be used to create and configure other types of modules and function blocks, such as the modules 32 and 34 and/or the FLC and PID function blocks therein, which routines are generally known in the art. Thus, the adaptive MPC function block 38 can be one of a set of different function blocks that can be selected and configured in a manner similar to function blocks which currently exist and are well known in the art. Additionally, as illustrated in FIG. 1, a user or an operator interface application 44 may communicate with the adaptive MPC control block 38 during operation thereof to enable a user, such as a control operator, to view information and data pertaining to the MPC control block 38, to modify the manner in which the MPC control block 38 operates to develop process models and to cause the MPC control block 38 to generate a new MPC control model and the MPC algorithm from a process model. In some cases, the user interface routine 44 may enable the user to provide tuning inputs to the adaptive MPC control block 38 to effect the operation of that block. Still further, the user interface routine 44 may be stored and executed in any of the workstations 13 or in any other desired user input device communicatively connected to the control system, such as a handheld device, a personal data assistant (PDA), a mobile phone, etc.

Figure 2:
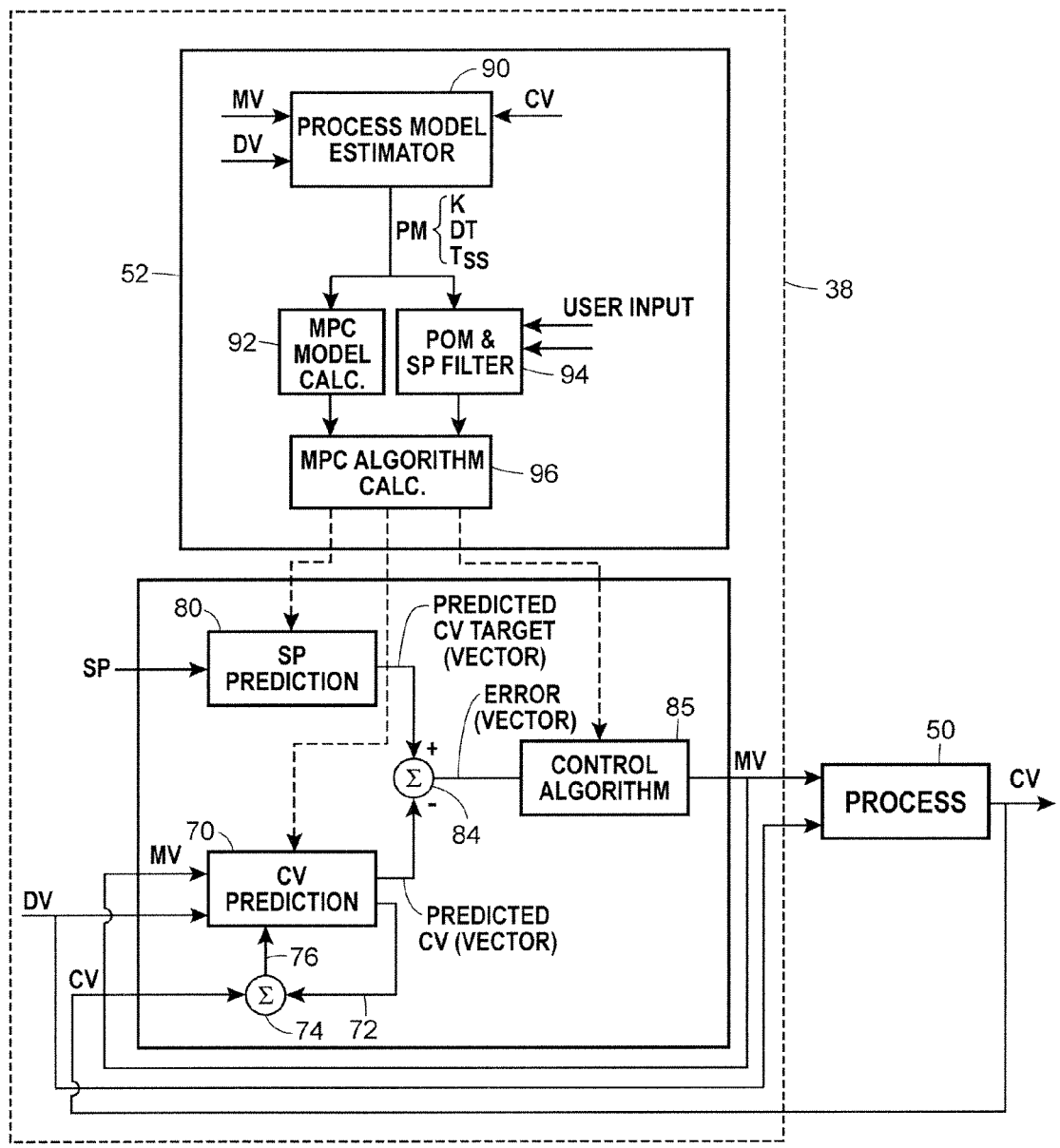
FIG. 2 is a block diagram of an adaptive MPC controller which may be implemented within the function block of FIG. 1.

FIG. 2 illustrates a detailed block diagram of one embodiment of the adaptive MPC control block 38 communicatively coupled to a process 50. It will be understood that, during operation, the adaptive MPC control block 38 produces one or more manipulated variables MVs that are provided to other function blocks (not shown in FIG. 2) which, in turn, are connected to control inputs of the process 50. As illustrated in FIG. 2, the adaptive MPC control block 38 includes an adaptive model generator 52 and an MPC controller block 54. The MPC controller block 54 is, in this instance, illustrated as a single-loop control block, e.g., one having a single control output in the form of a single control signal (or manipulated variable) MV that is, in turn, provided to the process 50 to perform process control. The MPC controller block 54 of FIG. 2 includes both a feedback and a feedforward path and thus includes inputs for both of these paths. However, in some cases, it may be possible to use a standard, square M by M (where M can be any number greater than one) MPC control routine having the same number of inputs as outputs, although such a device will not be described herein.

The MPC controller block 54 receives, as inputs, a measured controlled variable CV (as measured within the process 50), a disturbance variable DV, a set point value or vector SP defining the desired target vector for the controlled variable CV, and the manipulated variable MV produced by the controller block. As is known, the disturbance variable DV represents measured or predicted change (e.g., a disturbance) in the process 50 and is illustrated as being provided to the process 50 at the same time as this value is provided to the controller block 54. Generally speaking, the disturbance variable DV represents the input to the feedforward path of the MPC controller 54 while the controlled variable CV represents the input to the feedback back path of the MPC controller 54.

As is typical in an MPC controller, the controlled variable CV and the disturbance variable DV are provided, along with the manipulated variable MV produced by the MPC controller 54, to the input of a controlled variable process model 70 (also referred to as a controlled variable prediction unit). The controlled variable prediction unit 70 uses a process model (referred to a control model) stored therein to predict the future values of the controlled variable CV based on the current and/or predicted future values of the manipulated variable MV and the disturbance variable DV. (Typically, a separate control model is used for each of these input variables). The controlled variable prediction unit 70 produces an output 72 representing a previously calculated prediction for the controlled variable CV for the current time and a vector summer 74 subtracts the predicted value of the controlled variable CV for the current time from the actual measured value of the controlled variable CV to produce an error or prediction correction vector on an input 76.

Generally speaking, the controlled variable prediction unit 70 uses a step response matrix (which in this case may be mathematically developed from a process model) to predict a future value for the controlled variable CV at each of the times over the prediction horizon, based on the disturbance and manipulated variables DV and MV and the error signal provided to other inputs of the controlled variable prediction unit 70. The output of the unit 70 is illustrated as a predicted CV vector. A set point prediction unit 80 provides a target vector for the controlled variable CV based on the set point SP provided thereto from any desired source, such as an optimizer, a user, a control operator, etc. In one embodiment, the set point prediction unit 80 may use the set point SP along with a pre-established change or filter vector which defines the manner in which controlled variable CV is to be driven to its set point value over time (i.e., defining the robustness and speed of the controller). The set point prediction unit 80 produces a dynamic control target vector (called a predicted CV target vector) for the controlled variable CV defining the changes in the set point value for the controlled variable CV over the time period defined by the prediction horizon. A summer 84, which may be a vector summer, then subtracts the predicted CV vector from the dynamic control target vector to define a future error vector for the controlled variable CV. The future error vector for the controlled variable CV is then provided to an MPC algorithm block 85 which operates to select the manipulated variable MV steps (for each of the time periods up to the control horizon) that minimize, for example, the least squared error, over the control horizon. Of course, the MPC algorithm block 85 may use a control matrix or other algorithm developed from relationships between the controlled variable CV and the disturbance variable DV input to the MPC controller 52 and the manipulated variable output by the MPC controller block 54. As is generally known, the MPC algorithm block 85 tries to minimize controlled variable CV error with minimal manipulated variable MV moves over the control horizon, while keeping the controlled variable CV within operational constraints and while achieving a steady state value for the manipulated and controlled variables MV and CV within a limited amount of time.

Generally speaking, the MPC controller block 54 operates once during each controller scan to produce a single-loop MPC control signal as the controlled variable CV to be used in controlling the process 50 based on the MPC control model and the control algorithm stored within the blocks 70 and 85, respectively. However, as noted above, the dynamics of the process 50 typically change over time, which can lead to a mismatch between the actual operation of the process 50 and the model of the process 50 being used within the MPC controller block 54.

To compensate for this problem, the adaptive model generator 52 operates to re-determine or update a process model representing the process 50 and, in particular, representing the loop of the process 50 being controlled by the MPC control block 54. The adaptive model generator may determine the same or separate process models for the feedback and the feedforward path of the MPC controller 54, if desired. The adaptive model generator 52 then uses the updated process model to determine a new MPC control model for use in the block 70 as well as a new MPC control algorithm for use in the block 85 to thereby enable the MPC controller 54 to operate based on a process model that more accurately reflects the current operation of the process 50. This updating process adapts the MPC controller 54 to the process 50 on-line during operation of the process 50 to thereby eliminate or reduce model mismatch and provide better control.

Generally speaking, the adaptive model generator 52 includes a process model estimator 90 which operates to determine or recalculate, on-line and while the process 50 is running, new models for the process 50 and, in particular, for the specific loop of the process 50 which is being controlled by the MPC controller block 54. The output of the process model estimator 90 is a process model, such a parameterized process model which defines the operation of the process 50 according to a set of parameters. The most common type of parameterized process model is a first order plus dead time process model which includes parameters for the process response time, the process gain and the process dead time, although other parameterized process models could be used instead. A method for defining or estimating process models from process variables for use in an adaptive PID controller is described in U.S. Pat. No. 6,577,908 entitled "Adaptive Feedback/Feedforward PID Controller," and U.S. Publication No. 2003/0195641, entitled "State Based Adaptive Feedback Feedforward PID Controller," the disclosures of both of which are hereby expressly incorporated by reference herein.

Generally speaking, the process model estimator 90 regularly collects data indicative of the controlled variable CV and one or more of the manipulated variable MV, the disturbance variable DV, and the set point SP, and possibly other variables if desired during normal operation of the process. The process model estimator 90 then periodically reviews or analyzes this data (or enables a user to do so via the user interface routine 44 of FIG. 1) to determine when significant changes occur in any of the process input variables that may cause the process 50 to react or need to be controlled, such as changes in the set point SP, the disturbance variable DV or the controlled variable CV. Upon detecting such a change, the process model estimator 90 then determines when the process variable (i.e., the controlled variable CV) reaches a steady state condition and uses the process data collected between these two points to determine the response of the process to the change. More particularly, disturbances within the process 50 or changes in the set point SP may cause the MPC controller 54 to implement a change in the control signal (the manipulated variable MV) to alter the process 50. Change in the controlled variable CV then reflect the process response to this change and the process model estimator 90 may use known techniques to determine a parameterized process model describing or modeling the process 50. As noted above, this parameterized process model may be defined as a first order plus dead time process model or as any other type of parameterized process model. Significantly, however, the process model estimator 90 does not have to disturb or upset the process 50 to determine the process model but, instead, analyzes process data collected during the normal or on-line operation of the process 50. As a result, the process model estimator 90 can execute continuously as a background process in the process controller device (e.g., the process controller 11 of FIG. 1) during normal operation of the process 50, without placing a large computational load on the controller processor and without upsetting the process 50.

After determining a new process model, the process model estimator 90 provides the process model (e.g., the calculated process gain K, dead time DT and time constant $T_c$) to an MPC model calculation unit 92 as well as to a penalty on move and set point target vector filter unit 94. The MPC model calculation unit 92 uses the new process model to calculate a typical MPC control model to be used in the controlled variable prediction unit 70. This MPC control model is generally in the form of a transfer function represented as a response curve defining the response of the controlled variable CV to a step change in the manipulated variable MV (or the disturbance variable for the feedforward path) over the time to the prediction horizon. This model is generally easy to mathematically calculate as the series of values of the controlled variable CV (one for each of the scan times up until the prediction horizon) which would result from a process defined perfectly by the parameterized process model developed by the process model estimator 90 in response to a step change in the manipulated variable MV.

After determining the MPC control model, the MPC model calculation unit 92 provides this model to an MPC algorithm calculation unit 96 and stores this model for future use or downloading into the controlled variable prediction unit 70 of the MPC controller 54 when updating the MPC controller 54. At essentially the same time, the penalty on move and set point target vector filter unit 94 calculates or otherwise determines a penalty on move and a set point trajectory or filter coefficients to be used in the MPC controller 54. In one embodiment, as described in more detail hereinafter, the set point target vector filter trajectory and the penalty on move, which are control tuning variables used in the SP prediction unit 80 and the MPC algorithm block 85 respectively, may be automatically calculated. For example, the penalty on move may be automatically based on the process time to steady state $T_{ss}$ which, in turn, is determined from response time of the process model developed by the process model estimator 90. In another embodiment, the penalty on move and the set point target vector filter trajectory may be input or specified by a user, such as a control operator.

An MPC algorithm calculation unit 96 uses the MPC control model (and typically inverts this model) as well as the penalty on move value to determine an appropriate control algorithm for use by the MPC algorithm block 85 based on the newly determined process model. Thereafter, at an appropriate time, such as when the process 50 is in a steady state or a quasi-steady state condition, or when instructed to by a user via a user interface, the adaptive model generator 52 updates the MPC controller block 54 by downloading the new MPC control model to the controlled variable prediction unit 70, the new SP trajectory or filter coefficients to the SP prediction block 80 (if changed), and the new MPC control algorithm to the MPC algorithm block 85.

In this manner, when the process model estimator 90 determines or detects a process model for the process 50 which differs in some significant manner from the process model that was used to configure the MPC controller 54, the MPC model calculation unit 92 and the MPC algorithm calculator block 96 may calculate new MPC controller parameters, models, and algorithms based on that model and then download these new MPC controller elements to the MPC controller 54.

Significantly, it has been determined that a single-loop MPC or other DMC-type controller having a control horizon of one or two, and possibly higher, can be adapted as described above without being computationally expensive, and therefore, that such an adaptive controller can be run or executed in a distributed or other process controller on-line while the process is running, thus providing a truly on-line adaptive MPC (or other DMC type) controller. In particular, it has been determined that the MPC control algorithm (as used in the block 85 of FIG. 2) for a single-loop MPC controller having a control horizon of one or two can be defined straightforwardly, i.e., as one or more simple mathematical formulas that are non-recursive and do not use matrix calculations. As a result, in these cases, determining the MPC control algorithm for the block 85 is not computationally excessive, thereby allowing the frequent and fast recalculation of a new MPC control model and control algorithm for the MPC control block 54 upon the receipt of a new process model. It is therefore possible to update or adapt the MPC controller block 54 on-line, while the process 50 is operating because such adaptation can occur quickly and in real time and can be performed within the distributed controller actually executing the MPC controller 54.

Still further, as noted above, it has been determined that single-loop MPC controllers including MPC with a small control horizon (e.g., one or two and possibly up to five) provide better control performance than PID controllers in many situations, such as in dead time dominant processes, and in processes in which the time to steady state changes over time.

Figure 3:
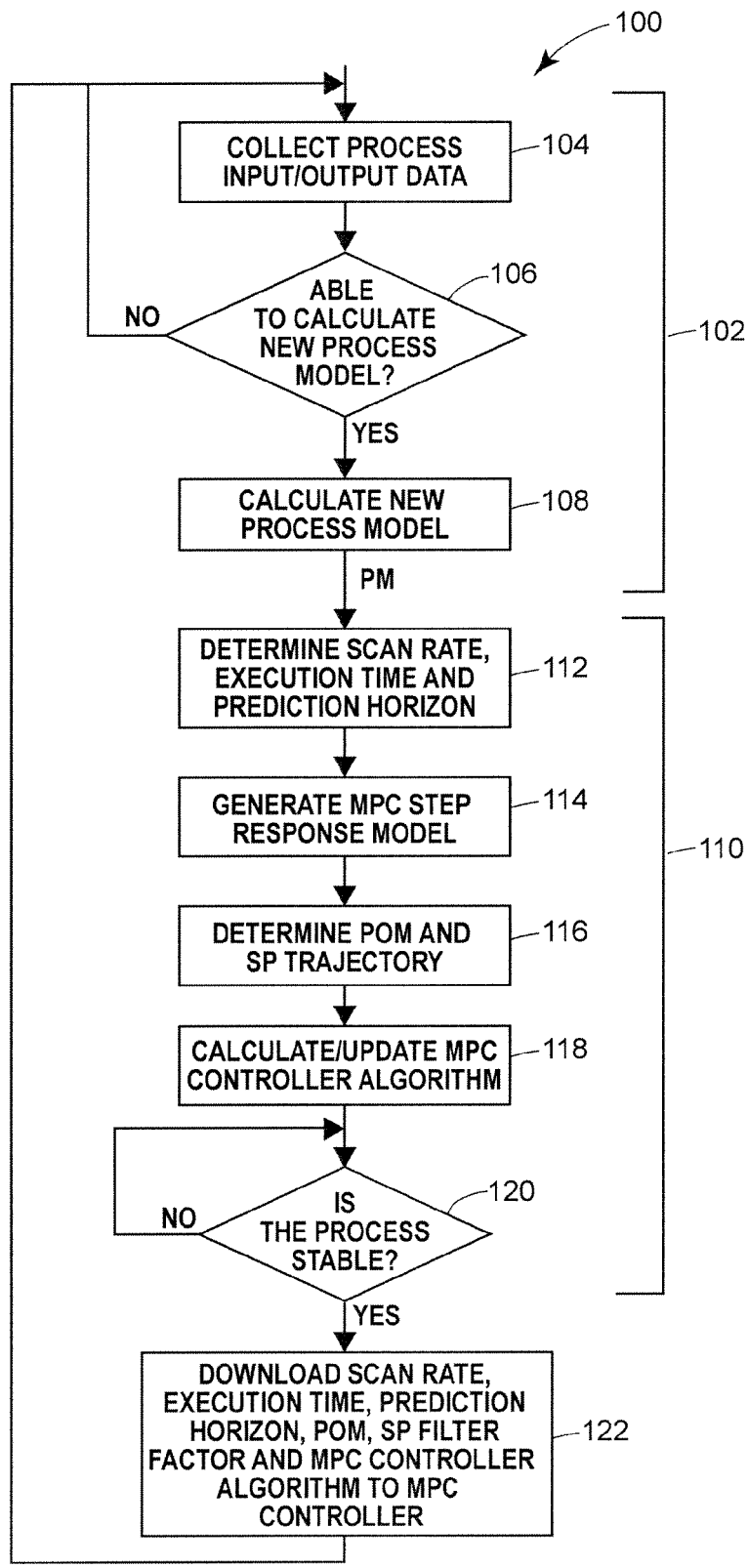
FIG. 3 is a flow chart illustrating the operation of the adaptive MPC controller of FIG. 2.

FIG. 3 illustrates a flow diagram 100 which may be used by the adaptive MPC control block 38 to perform adaptive control within the controller 11 of FIG. 1. In a first section 102 of the routine 100, the process model estimator 90 operates while the process 50 is operating on-line to collect process input/output data such as data indicative of the controlled variable CV, the manipulated variable MV, the set point SP and the disturbance variable DV, as well as any other desired or necessary data, and stores this data in a memory. Periodically, such as after every data collection instance, after collecting a certain amount of data, after a certain period of time, in response to a user command, etc., the process model estimator 90 looks for a block of data that may be used to define a new process model and in particular, looks for disturbances in the process inputs (such as changes in the control signal) which causes the process output (e.g., the controlled variable CV) to change and then reach a steady state value. When such a change is detected, or in response to a user selection of a set of data to use for developing a process model, the process model estimator block 90 analyzes the selected or determined block of process data to generate a new process model.

More particularly, a block 104 which may be implemented by the process model estimation unit 90, collects process input/output data and a block 106 determines whether enough data has been collected over a time period in which the process has undergone a change sufficient enough to calculate a new process model. The block 106 may also be responsive to user commands to generate a process model from a selected set of process data. If the collected data is not such that the process model estimation unit 90 can calculate a new process model or the user has not instructed the routine 100 to develop a new process model, the block 104 continues to collect process input/output data. On the other hand, if enough process data has been collected over a time period in which the process has undergone a change or disturbance significant enough to calculate a new process model, or if a user has initiated a process model calculation, a block 108 calculates a new process model using, for example, the technique described in U.S. Pat. No. 6,577,908 and/or in U.S. Publication No. 2003/0195641 and provides the new process model to a second section 110 of the routine 100.

The section 110 of the routine 100 determines a new MPC model and algorithm from the determined process model. For the sake of this description, the process model determined by the block 108 will be assumed to be a parameterized first order plus dead time process model including parameters defining a process gain, a process dead time and a process time constant for both the feedback path and the feedforward path. However, it will be understood that the process model could include parameters only for the feedback path, could be a first order process model of a different type or nature or could be any type of process model other than a first order process model. Thus, generally speaking, other types or forms of process models could be used instead.

As illustrated in FIG. 3, the section 110 of the routine 100 includes a calculation block 112 that may be implemented by the penalty on move and set point target vector filter unit 94 of FIG. 2, which determines one or more of the scan rate, the execution time, the prediction horizon and the time to steady state for the MPC controller based on new process model.

Similar to an adaptive PID control technique, the time to steady state $T_{ss}$ is updated after every successful model identification based on the process model and in particular, based on the time constant of the process model. However, unlike a PID controller which can run at any scan rate (as long as the scan rate is a couple of times faster than the process response time), the adaptive MPC controller must run at a scan rate that keeps the time to steady state $T_{ss}$ inside of the prediction horizon used by the MPC controller. In order to alter or change the scan rate of the MPC controller as part of the adaptive process and thereby provide better control, it has been determined that the execution time and or the prediction horizon used by the MPC controller (which are typically fixed in MPC controllers) can be changed, to thereby provide for better MPC controller operation.

To assure that the new scan rate is selected appropriately, the block 112 first determines the process time to steady state $T_{ss}$ from the new process model in any known manner and, in particular, based on the time constant determined in the process model for, for example, the feedback path of the MPC controller 54. The time to steady state $T_{ss}$ may be determined or expressed in actual time (e.g., in minutes, seconds, etc.) or may be expressed in the number of executions cycles needed by the controller during the time to steady state based on fixed controller execution time per execution cycle.

Next, the execution time can be calculated as the time to steady state $T_{ss}$ divided by the maximum allowable prediction horizon, which may be set by a user or by a configuration engineer during configuration of the adaptive MPC controller. This calculation can be expressed as:

Exec_Time=Trunc[$T_{ss}/PH_{max}$]

wherein:
Exec_Time=execution time
$T_{ss}$=time to steady state; and
$PH_{max}$=maximum prediction horizon.

Here, Trunc is the mathematical truncation operation.

In an embodiment described, a maximum prediction horizon $PH_{max}$ of 120 is used, which means that up 120 predictions may be calculated by the controlled variable prediction unit 70 during each scan. However, in many cases, this calculation leads to a reminder, which causes more or less imprecision in the operation of the MPC controller. To avoid division with a remainder and thereby to reduce floating point error and jitter in the controller operations, the prediction horizon may be allowed to vary between a minimum value $PH_{min}$ and the maximum value $PH_{max}$ and may be chosen so that the product of the selected prediction horizon PH and the execution time equals the time to steady state $T_{ss}$ exactly. The selected prediction horizon is then used as the prediction horizon within all of the internal loops within the MPC controller (i.e., within all of the blocks 70, 74, 80, 84, and 85 the controller block 54 of FIG. 2) instead of the maximum allowable prediction horizon $PH_{max}$. Thus, in this case, the prediction horizon may change between, for example, 60 and 120 depending upon the actual time to steady to state $T_{ss}$ determined for a new process model.

The following Table 1 illustrates examples of various combinations of execution times Exec_Time and selected prediction horizons PH which may be advantageously used within the MPC controller 54 based on a particular time to steady state $T_{ss}$ of the new process model. As will be understood, the time to steady state $T_{ss}$ of this table (which is the known variable from which the execution time and the prediction horizon are determined) is varied between 10 and 12800 seconds in this case, while the execution time varies between 0.1 to 213 ms, resulting in a selected prediction horizon PH somewhere between 60 and 120 in all cases. While not necessary, the prediction horizon is set to be 60, i.e., the minimum allowable value, for each time to steady state value greater than 3200 because a prediction horizon greater than 60 is not necessary for such a large time to steady state. In any event, if desired the results of Table 1 or a similar such pre-calculated table relating a desirable combination of a prediction horizon and an execution time to different determined process time to steady states $T_{ss}$ may be stored in the adaptive model generator 52 to be used to determine the appropriate prediction horizon to use in the MPC controller based on the determined process model time to steady state $T_{ss}$. Of courses any other desired manner of generating combinations of the prediction horizon and the execution time based on a determined process time to steady state may be used instead.

TABLE 1

| $T_{SS}$ | Exec_Time | PH |
|---|---|---|
| 10 | 0.1 | 100 |
| 20 | 0.3 | 67 |
| 30 | 0.5 | 60 |
| 40 | 0.6 | 67 |
| 50 | 0.8 | 63 |
| 60 | 1 | 60 |
| 70 | 1 | 70 |
| 80 | 1 | 80 |
| 90 | 1 | 90 |
| 100 | 1 | 100 |
| 110 | 1 | 110 |
| 120 | 2 | 60 |
| 130 | 2 | 65 |
| 140 | 2 | 70 |
| 150 | 2 | 75 |
| 160 | 2 | 80 |
| 170 | 2 | 85 |
| 180 | 3 | 60 |
| 190 | 3 | 63 |
| 200 | 3 | 67 |
| 210 | 3 | 70 |
| 220 | 3 | 73 |
| 230 | 3 | 77 |
| 240 | 4 | 60 |
| 250 | 4 | 63 |
| 260 | 4 | 65 |
| 270 | 4 | 68 |
| 280 | 4 | 70 |
| 290 | 4 | 73 |
| 300 | 5 | 60 |
| 310 | 5 | 62 |
| 320 | 5 | 64 |
| 330 | 5 | 66 |
| 340 | 5 | 68 |
| 350 | 5 | 70 |
| 360 | 6 | 60 |
| 400 | 6 | 67 |
| 800 | 13 | 62 |
| 1600 | 26 | 62 |
| 3200 | 53 | 60 |
| 6400 | 106 | 60 |
| 12800 | 213 | 60 |

In any event, as will be seen, the adaptive MPC controller block 38 is actually able to change or alter its prediction horizon and execution time during the adaptation process in order to assure that the controller scan rate is set so as to keep the time to steady state $T_{ss}$ within the prediction horizon. If desired, the block 112 may compare the execution time to the scan rate of the controller to determine if the selected or calculated execution time is smaller than the configured scan rate of the controller. If this condition is true, the block 112 may issue a warning message to a user via, for example, the operator interface application 44, indicating that the controller block scan rate should be increased to enable the proper operation of the MPC controller.

Next, a block 114, which may be implemented in the MPC model calculation block 92 of FIG. 2 determines or establishes a step response model (the MPC control model) defining the reaction of the controlled variable CV over the time defined by the prediction horizon PH to a step change in the manipulated variable MV (for the feedback loop) and defining the reaction of the controlled variable CV over the time defined by the prediction horizon PH to a step change in the disturbance variable DV (for the feedforward loop). Of course, such a step response model may be mathematically generated from the process model developed by the block 90. Generally speaking, the response of the controlled variable CV is calculated for each of the number of controller scans defined by the prediction horizon PH determined by the block 112. Thus, if the prediction horizon is 120, 120 different responses of the controlled variable CV will be determined in response to a step change in the manipulated variable MV at the first time instance, to define the MPC step response model (for the feedback controller path). This step response model will be referred to herein as a step response vector B defined in non-vector form as $(b_1, b_2, \ldots, b_i, \ldots b_i, \ldots b_p)$ where p is the selected prediction horizon and $b_p$ is the response at the selected prediction horizon.

Next, a block 116 calculates or determines the penalty on move and the penalty on error to be used in the MPC algorithm and, if desired, the set point filter constant or trajectory to be used in the MPC controller to determine the response and robustness of the MPC controller 54. These parameters are, in essence, tuning parameters for the MPC controller. If desired, the penalty on error, the SP filter and the penalty on move may be determined automatically or may be set by a user via input via, for example, the user interface application 44 of FIG. 1.

One manner of automatically setting the set point target vector filter time constant is to define a set point target vector filter time factor which defines the operation of the set point target vector filter in relation to the time to steady state of the process. For example, a set point target vector filter time factor could range from 0 to 4 and then the set point target vector filter time constant (defining the time constant of the set point target vector filter) can be determined as the product of the process time to steady state $T_{ss}$ and the set point target vector filter time factor. As will be understood, this set point target vector filter time factor could change with each new process model identification. Of course, the set point target vector filter factor or the set point target vector filter time constant could be selected or provided by the user, if so desired.

Generally speaking, the penalty on error (which defines the coefficient that the MPC controller algorithm applies to an error vector between the desired CV and the predicted CV during the calculation of the controller moves) may be set to one and need not be changeable. In fact, in a single-loop system, only the ratio between the penalty on move (POM) and the penalty on error (PE) matters, meaning that as long as one of these variables is changeable, the other need not be.

In one embodiment, a default penalty on move (which defines the penalty that the MPC control algorithm accesses to unit control signal moves during the calculation of the controller moves) may be calculated every time the process model changes as:

$$PM = 3\left(1 + \frac{6DT}{PH} + \frac{3G*DT}{PH}\right)$$

Here DT is the process dead time (from the process model), PH is the prediction horizon, G is the process gain (from the process model) and PM is the calculated penalty on move. Generally speaking, this equation, which has been determined heuristically based on observations, accesses a higher penalty on moves as the process dead time increases, and to a lesser extent, as the process gain increases. Of course, other equations or methods of calculating a recommended or default value for the penalty on move could be used instead.

In any event, the recommended value of the penalty on move may be displayed on the user interface (e.g., using the interface application 44 of FIG. 1) as a read-only parameter. If desired, however, the user interface application 44 may allow the user to change the recommended value (which may be used as a default setting) to other values. Manners of performing this change include allowing the user to specify the desired POM directly or allowing the user to specify a POM factor to be used to change the recommended value (i.e., as a multiplier of the recommended value). Such a POM factor could range, for example, from 0.1 to 10 and may be altered or selected by a user using, for example, a slider bar or an attribute box in a user interface display screen. In any case, the user interface may specify, in addition to the recommended POM value and the POM factor, the actual value of the POM being used in the MPC controller (which actual value would be the product of the POM factor and the recommended value of the POM).

Referring again to FIG. 3, a block 118 then calculates or determines the MPC control algorithm to be used in the MPC algorithm block 85 of FIG. 2 during operation of the MPC controller 54. Generally speaking, when the MPC controller 54 is a single-loop controller with a control horizon of one or two, this algorithm can be expressed in a closed form, which means that regenerating this algorithm upon a model update is computationally straightforward.

Generally, the block 118 develops an MPC unconstrained incremental controller from the step response model (or step response vector), the penalty on move (POM) and the penalty on error (which is assumed for this discussion to be one). The general solution for the incremental controller with control horizon m and a prediction horizon p at controller scan k is:

$$\Delta U(k) = KE_p(k) = (S^{uT}\Gamma^{yT}\Gamma^{y}S^{u} + \Gamma^{uT}\Gamma^{u})^{-1}S^{uT}\Gamma^{yT}\Gamma^{y}E_p(k)$$

Where:

K is the controller gain matrix to be calculated for the MPC controller;

$\Delta U(k)$ is an m step ahead incremental controller output moves vector;

$\Gamma^{y} = \text{diag}[\gamma_1, \gamma_2, \ldots, \gamma_p]$ is a penalty matrix on the output error;

$\Gamma^{u} = \text{diag}[u_1, u_2, \ldots, u_m]$ is a penalty matrix on the control moves;

$S^{u}$ is the p by m process dynamic matrix (the control matrix); and $E_p(k)$ is the error vector over the prediction horizon.

For an MPC controller with a control horizon equal to one, the dynamic matrix (transposed) is:

$S^{uT} = B^T = [b_1, \ldots, b_i, \ldots, b_p]^T$ which is simply the transposed step response vector.

Additionally:

$\Gamma^{y} = \text{diag}^p[\gamma, \gamma, \ldots, \gamma]$ and $\Gamma^{u} = \text{diag}[u] = u$ where each u is an individual penalty on move and each y is an individual penalty on error. Now, given the above, the MPC controller matrix can generally be expressed as:

$$K = (S^{uT}\Gamma^{yT}\Gamma^{y}S^{u} + u^2)^{-1} S^{uT}\Gamma^{yT}\Gamma^{y} = \frac{\gamma^2(b_1, \ldots, b_i, \ldots, b_p)}{\sum_{1}^{p} b_i^2 \gamma^2 + u^2} = \frac{b_1, \ldots, b_i, \ldots, b_p}{\sum_{1}^{p} b_i^2 + \frac{u^2}{\gamma^2}}$$

It is reasonable to assume that, and the adaptive controller is set up so that, $\gamma=1$. As a result the controller gain matrix can be expressed as:

$$K = \frac{b_1, \ldots, b_i, \ldots, b_p}{\sum_{1}^{p} b_i^2 + u^2} = \frac{b_1, \ldots, b_i, \ldots, b_p}{c_1 + c_2}$$

Thus, its easy to see that the single-loop MPC controller with a control horizon of one is simply a process step response vector scaled by the sum of two coefficients:

$$C_1 = \sum_{1}^{p} b_i^2 \text{ and}$$
$$C_2 = u^2.$$

As a result, it is a simple computational step to regenerate the controller gain matrix K as a closed form, non-recursive and non-matrix equation, to be used in the MPC algorithm block 85 of FIG. 2 on-line within the controller 11 while the process is operating each time a new process model is identified.

In the case of an MPC controller with a control horizon equal to two, the dynamic matrix (transposed) can be expressed as:

$$S^{uT} = \begin{bmatrix} b_1, \ldots, b_i, \ldots, b_{p-1}, b_p \\ 0, b_1, \ldots, b_i, \ldots, b_{p-1} \end{bmatrix}^T$$

with $$\Gamma^{y} = diag^{p}[\gamma, \gamma, \ldots, \gamma] \text{ and}$$

$$\Gamma^{u} = diag[u] = \begin{bmatrix} u, 0 \\ 0, u \end{bmatrix}$$

In this case, the controller gain matrix K is derived as:

$$K = \left(S^{uT}\Gamma^{yT}\Gamma^{y}S^{u} + \begin{bmatrix} u^2, 0 \\ 0, u^2 \end{bmatrix}\right)^{-1} S^{uT}\Gamma^{yT}\Gamma^{y} = \begin{bmatrix} \gamma^2 \sum_{1}^{p} b_i^2 + u^2, & \gamma^2 \sum_{1}^{p-1} b_i b_{i+1} \\ \gamma^2 \sum_{1}^{p-1} b_i b_{i+1}, & \gamma^2 \sum_{1}^{p} b_i^2 + u^2 \end{bmatrix}^{-1} \begin{bmatrix} b_1, \ldots, b_i, \ldots, b_{p-1}, b_p \\ 0, b_1, \ldots, b_i, \ldots, b_{p-1} \end{bmatrix} \gamma^2$$

$$K = \frac{\gamma^2 \begin{bmatrix} \sum_{1}^{p-1} b_i^2 + \frac{u^2}{\gamma^2}, & -\sum_{1}^{p-1} b_i b_{i+1} \\ -\sum_{1}^{p-1} b_i b_{i+1}, & \sum_{1}^{p} b_i^2 + \frac{u^2}{\gamma^2} \end{bmatrix}}{\gamma^4 \left(\sum_{1}^{p-1} b_i^2 + \frac{u^2}{\gamma^2}\right)\left(\sum_{1}^{p} b_i^2 + \frac{u^2}{\gamma^2}\right) - \gamma^4 \left(\sum_{1}^{p-1} b_i b_{i+1}\right)^2} \begin{bmatrix} b_1, \ldots, b_i, \ldots, b_{p-1}, b_p \\ 0, b_1, \ldots, b_i, \ldots, b_{p-1} \end{bmatrix} \gamma^2$$

$$K = \frac{\begin{bmatrix} b_1\left(\sum_{1}^{p-1} b_i^2 + \frac{u^2}{\gamma^2}\right), b_2\left(\sum_{1}^{p-1} b_i^2 + \frac{u^2}{\gamma^2}\right) - b_1\sum_{1}^{p-1} b_i b_{i+1}, \ldots, b_p\left(\sum_{1}^{p-1} b_i^2 + \frac{u^2}{\gamma^2}\right) - b_{p-1}\sum_{1}^{p-1} b_i b_{i+1} \\ -b_1\sum_{1}^{p-1} b_i b_{i+1}, -b_2\sum_{1}^{p-1} b_i b_{i+1} + b_1\left(\sum_{1}^{p} b_i^2 + \frac{u^2}{\gamma^2}\right), \ldots, -b_p\sum_{1}^{p-1} b_i b_{i+1} + b_{p-1}\left(\sum_{1}^{p} b_i^2 + \frac{u^2}{\gamma^2}\right) \end{bmatrix}}{\left(\sum_{1}^{p-1} b_i^2 + \frac{u^2}{\gamma^2}\right)\left(\sum_{1}^{p} b_i^2 + \frac{u^2}{\gamma^2}\right) - \left(\sum_{1}^{p-1} b_i b_{i+1}\right)^2}$$

To express this equation more simply, the following variables can be defined:

$$m = \sum_1^{p-1} b_i^2 + \frac{u^2}{\gamma^2};$$

$$n = \sum_1^p b_i^2 + \frac{u^2}{\gamma^2} = m + b_p;$$

$$l = \sum_1^{p-1} b_i b_{i+1};$$

$$r_1 = \frac{l}{m}; \text{ and}$$

$$r_2 = \frac{n}{l}$$

Then using these variables, the controller gain matrix K can be expressed as:

$$K = \frac{\begin{bmatrix} b_1 m, b_2 m - b_1 L, \ldots, b_p m - b_{p-1} l \\ -b_1 l, -b_2 l + b_1 n, \ldots, -b_p l + b_{p-1} n \end{bmatrix}}{mn - l^2} =$$

$$\frac{\begin{bmatrix} m\left(b_1, b_2\left(1 - \frac{b_1}{b_2}r_1\right), \ldots, b_p\left(1 - \frac{b_{p-1}}{b_p}r_1\right)\right) \\ l\left(-b_1, -b_2\left(1 - \frac{b_1}{b_2}r_2\right), \ldots, -b_p\left(1 - \frac{b_{p-1}}{b_p}r_2\right)\right) \end{bmatrix}}{mn - l^2}$$

which can be re-expressed as:

$$K = \frac{\begin{bmatrix} m\left(b_1, b_2\left(1 - \frac{b_1}{b_2}r_1\right), \ldots, b_p\left(1 - \frac{b_{p-1}}{b_p}r_1\right)\right) \\ l\left(-b_1, -b_2\left(1 - \frac{b_1}{b_2}r_2\right), \ldots, -b_p\left(1 - \frac{b_{p-1}}{b_p}r_2\right)\right) \end{bmatrix}}{mn - l^2} = \frac{\begin{bmatrix} m_1 \\ m_2 \end{bmatrix}}{mn - l^2}$$

Now, the MPC controller gain matrix for the first controller move of the $k_1$ (i.e., the first controller more of the two move control horizon) is:

$$k_1 = \frac{[m_1]}{mn - l^2} = \frac{m\left(b_1, b_2\left(1 - \frac{b_1}{b_2}r_1\right), \ldots, b_p\left(1 - \frac{b_{p-1}}{b_p}r_1\right)\right)}{mn - l^2} =$$

$$\frac{\left[b_1, b_2\left(1 - \frac{b_1}{b_2}r_1\right), \ldots, b_p\left(1 - \frac{b_{p-1}}{b_p}r_1\right)\right]}{n - l r_1}$$

As will be understood, therefore, the first move of the two move controller matrix is a resealed step response vector, which to some degree is similar to the control vector for the control horizon equal one. The constant scaling factor for all step response coefficients is:

$$\frac{1}{n - l r_1} = \frac{1}{\sum_1^p b_i^2 + \frac{u^2}{\gamma^2} - \frac{\left(\sum_1^{p-1} b_i b_{i+1}\right)^2}{\sum_1^{p-1} b_i^2 + \frac{u^2}{\gamma^2}}}$$

This coefficient decreases when the penalty on move (u) increases and so an individual scaling factor for every step response coefficient can be expressed as:

$$1 - \frac{b_{p-1}}{b_p} r_1 = 1 - \frac{b_{p-1}}{b_p} \frac{\sum_1^{p-1} b_i b_{i+1}}{\sum_1^{p-1} b_i^2 + \frac{u^2}{\gamma^2}}$$

This derived formula illustrates, in a clear way, the resemblance of a step response vector and the controller vector. However, this equation is not suitable for the controller calculations because of the uncontrolled possibility of division by zero in the step coefficients ratios. However, a suitable implementation form can be defined as:

$$k_1 = \frac{[b_1 m, b_2 m - b_1 l, \ldots, b_p m - b_{p-1} l]}{mn - l^2}$$

To determine this controller gain for the first move, a calculation sequence could be set as follows:

First, calculate m as:

$$m = \sum_1^{p-1} b_i^2 + \frac{u^2}{\gamma^2}$$

Second, calculate n as:

$$n = \sum_1^p b_i^2 + \frac{u^2}{\gamma^2} = m + b_p$$

Third, calculate l as:

$$l = \sum_1^{p-1} b_i b_{i+1}$$

Next calculate:

$$mn - l^2$$

Thereafter, rescale the step response by m, and then rescale the step response by l and shift to the right, i.e., make $b_1 = 0$.

Next, subtract the two resealed step responses mB−lB (shifted) and rescale the vector obtained from this step by $$\frac{1}{mn - l^2}$$

to get the controller vector.

In a similar manner, the MPC controller matrix or gain for the second controller move $k_2$ can be expressed as:

$$k_2 = \frac{[m_2]}{MN - L^2} = \frac{\left[\left(-b_1, -b_2\left(1 - \frac{b_1}{b_2}R_2\right), \ldots, -b_p\left(1 - \frac{b_{p-1}}{b_p}R_2\right)\right)\right]}{MR_2 - L}$$

Again, as illustrated above, for the case of a single-loop MPC controller with a control horizon of two, the controller gain equations are not computationally excessive and thus can be determined on-line within the controller while the controller is operating to control the process. Additionally, while the controller gain algorithms for an MPC controller with a control horizon of one and two have been provided herein, it is possible that MPC controllers with larger control horizons of, for example, three, four, five or even higher, may be expressed and determined using mathematical computations that lend themselves to be executed in the process controller device and thereby allow adaptive MPC controller regeneration on-line during actual control of a process.

Referring again to FIG. 3, after the block 118 has calculated or generated the controller gain algorithm for use in the MPC algorithm block 85 of FIG. 2, a block 120 determines whether the MPC controller 54 should be updated with the new controller parameters. As part of this process, the block 120 may determine if the process is currently in a steady state or in a quasi-steady state or is otherwise ready to have the MPC controller 54 updated. The block 120 may also or instead determine if a user has initiated an adaptive cycle or has otherwise specified that the MPC controller 54 should be updated based on a new process model. If the process is currently undergoing a control change or is experiencing significant fluctuation in the controlled variable CV, the block 120 may wait until the process reaches a steady state or a quasi-steady state condition. However, when the process is at steady state or is otherwise in a condition to undergo a controller change and, if desired, the user has authorized a controller update, a block 122 downloads the new control algorithm into the MPC algorithm block 85 and the new step response model to the controlled variable prediction unit 70. Additionally, the block 122 downloads the new scan rate, time to steady state, execution time and prediction horizon into all of the blocks 70, 74, 76, 80 and 85 of the MPC controller 54 so that these blocks all operate according to the same prediction horizon, scan rate and execution time. Still further, if desired, a new set point target vector filter constant or factor can be downloaded to the SP prediction unit 80 while a new penalty on move value can be provided to be used within the control algorithm 85 to thereby tune the MPC controller 54 with the new control parameters based on the new process model.

When the download is complete, the block 122 returns control to the block 104 to continue collecting data. It will of course be understood that the control block 104 can continue to collect process data during the operation of the other blocks of the routine 100. Still further, as indicated above, the set point target vector filter factor or time constant and the penalty on move variable are two tuning factors which can be changed by a user at any time, and may be downloaded to the MPC controller to change the operation of the MPC controller 54 at any time. Thus, the MPC controller may be tuned at various times and need not wait to be tuned until the MPC controller is updated based on a new process model. In other words, the MPC controller 54 may by updated with new set point target vector filter factors and new penalty on move values at any time during the operation of the process.

Figure 4:
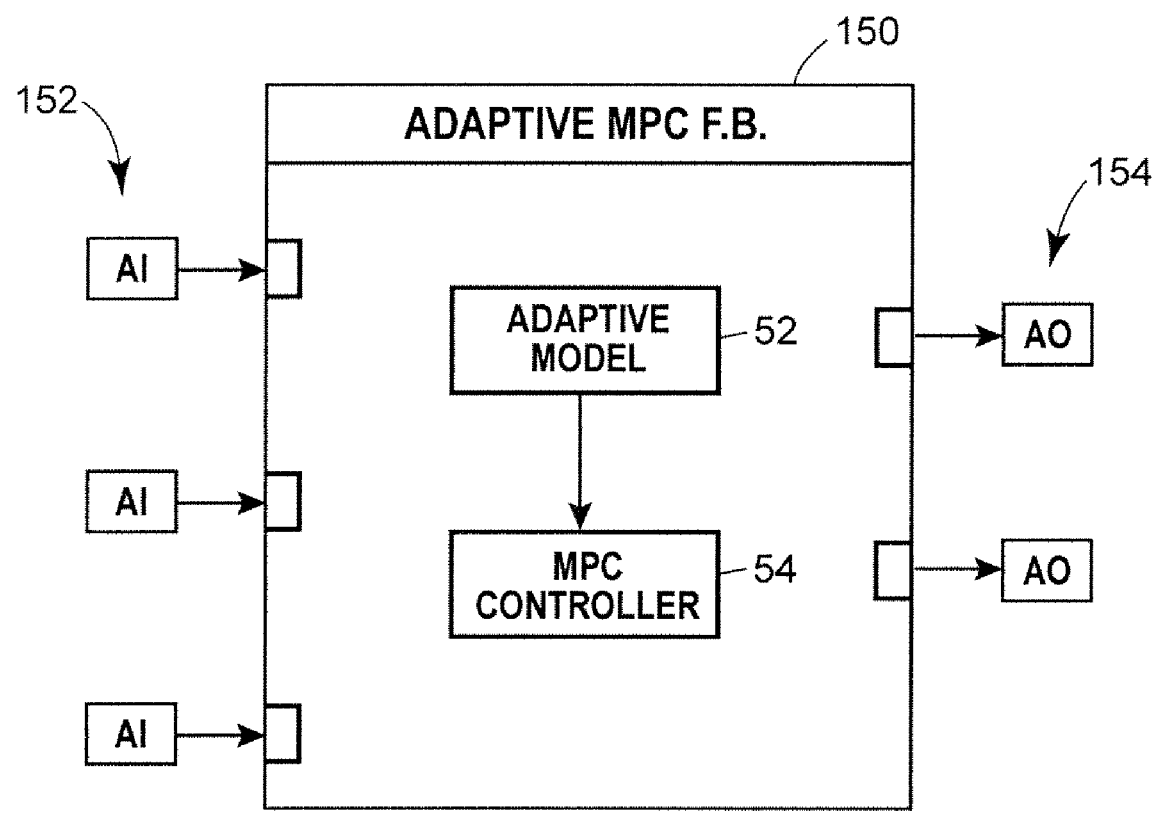
FIG. 4 is a block diagram of a control module which may be used in a process controller to implement the adaptive MPC controller of FIG. 2.

FIG. 4 generally illustrates an adaptive MPC controller block indicated or depicted as a function block 150 coupled within to other function blocks 152 and 154 to form a control module. The function blocks 152 are illustrated as AO function blocks and the function blocks 154 are illustrated as AI function blocks, although other types, kinds and numbers of function blocks could be used instead, and operate within the controller (such as the controller 11 of FIG. 1) during operation of the process to effect input and output functions for the function block 150. As depicted in FIG. 4, the adaptive model generator 52 and the MPC controller 54 are stored within and executed in the adaptive MPC controller function block 150 and these blocks are communicatively connected as necessary to receive inputs delivered by the AI blocks 152 and to provide outputs as necessary to the AO blocks 154 to thereby effect control of the process or of a loop of the process. Of course, any necessary number of AI blocks 152 and AO blocks 154 may be provided and these function blocks may be coupled to receive any desired signals or to send signals to any desired components within the process plant in any known manner. Generally speaking, however, at least a single AI and a single AO block is provided for the single-loop MPC controller to provide control in the feedback path. However, if desired, additional inputs and outputs may be communicatively connected to the adaptive model generator 52 and to the MPC controller 54 to provide similar single-loop MPC control on the feedforward path, which may be controlled in a manner similar to that described above with respect to the feedback path. Additionally, the MPC controller 54 may be adapted for the feedforward path in the manner described generally herein for the feedback path. Still further, if desired, the adaptive model generator 52 may receive input signals from the process plant which are not used by the MPC controller 54 in controlling the process.

Figure 5:
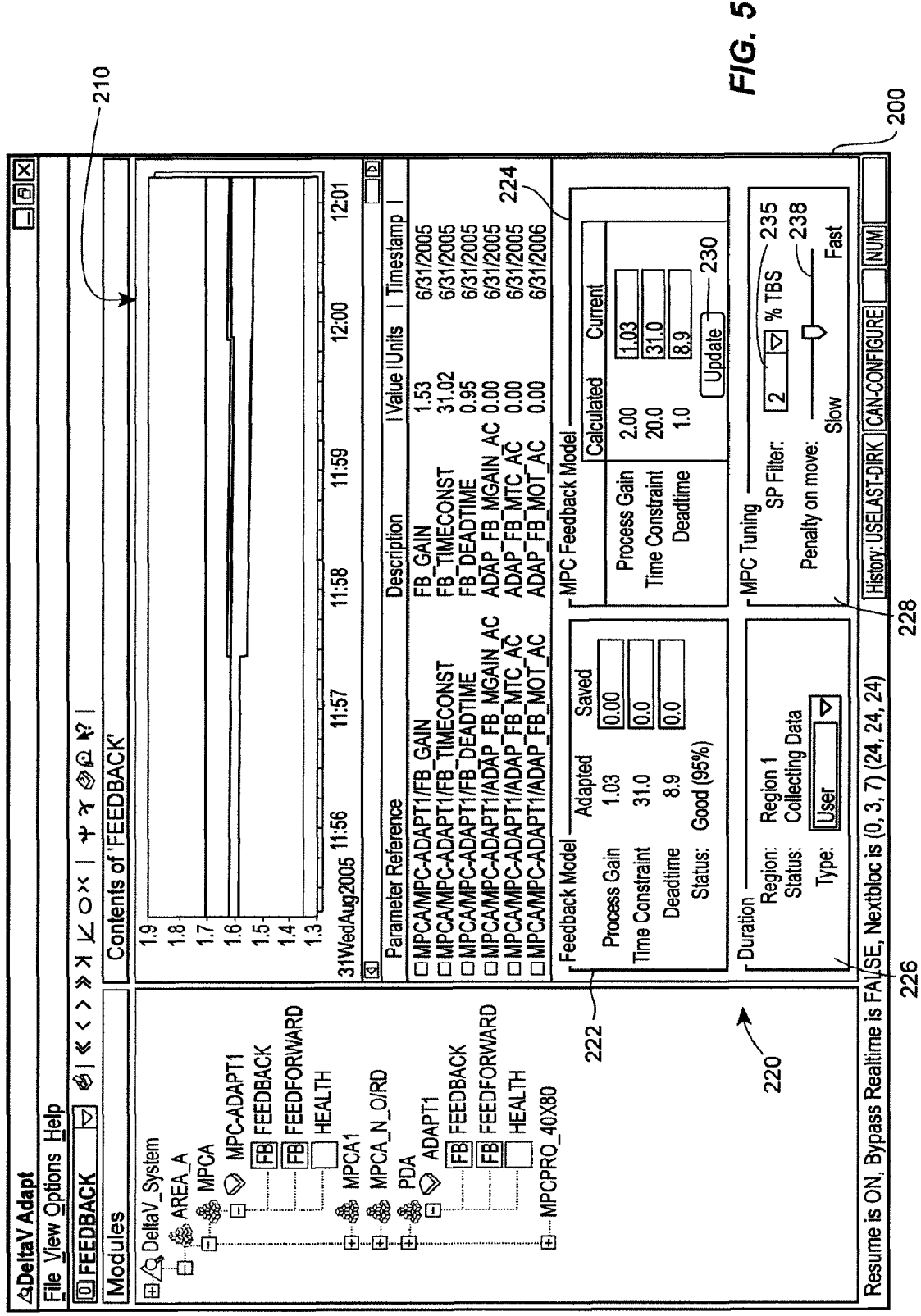
FIG. 5 is a screen display associated with a configuration or operator interface routine illustrating a manner in which a user can view and effect the operation of the adaptive MPC controller of FIG. 2.

FIG. 5 illustrates a display screen 200 which may be provided by the user interface application 44 of FIG. 1 on a display device such as the user interface screen 14 of FIG. 1 to allow the user to view what is happening within the adaptive MPC function block 150 or 38 as well as to direct the adaptive MPC process. In particular, the user interface application 44 may provide the display screen 200 to enable the user to view and select the data on which the process model is to be determined, to initial a model adaptation procedure, to provide or change tuning parameters for the MPC controller, etc. In particular, the display screen 200 includes a process operation display area 210 illustrating the current operation of the process and, in particular, the historical values of the controlled variable, the set point, the manipulated variable and/or any other desired variables, to indicate or show the process operation in an easily understandable manner. The user, if desired, can view this data and can highlight or select portions of this data (using a mouse or other input device) to specify the data to be used when calculating a new process model for the process.

A section 220 of the display screen 200 illustrates information for the various models associated with the process and the MPC controller to provide the user with a better understanding of what is currently happening within the process or within the adaptive MPC portion of the process. The section 220 of FIG. 5 is divided into four sub-sections including a feedback model section 222, an MPC feedback model section 224, an operations section 226 and an MPC tuning section 228. Generally, the feedback model section 222 provides the user with indications of the process model that has been most recently calculated for the feedback path of the MPC controller, and in this case provides the values of the model parameters for such a model defined as process gain, process time constant and dead time. This current model need not be and probably will not be the process model used to generate the MPC controller currently running within the plant.

The MPC feedback model section 224 shows (under the column titled "Calculated") the MPC model that was used to calculate the MPC algorithm and MPC process model currently be used for the feedback path of the MPC controller. In this case, the process controller is currently operating using an MPC controller that was generated based on a process model that had a process gain of 1.00, a time constant of 20.0 and a dead time of 1.0 However, the section 224 also shows the "Current" value of the most recently determined process model for the process as the model to use for the next adaptation cycle, when implemented. This model is illustrated in the example of FIG. 5 as being the most recently calculated process model shown in the feedback model section 222. As indicated, the user could change or vary this process model if so desired by entering new values for the model parameters. Additionally, an update button 230 allows the user to initiate an adaptive MPC generation or calculation using the new process model specified in the current values section of the process model. Of course, if desired, the most recently calculated process model could be automatically used and the MPC controller adaptation could be automatically and periodically implemented after every process model generation to update the MPC control model, instead of or in addition to the user initiating such an update with the update button 230.

The operations section 226 of the screen 200 illustrates the operational region in which the process is currently operating. It is noted that the process can be defined as having separate operational regions as determined by, for example, values of the controlled variables or any other variables. If desired, different models may be selected and used based on the operational region in which the process is running. In fact, some operational regions may be more adaptable to the use of the adaptive MPC controller described herein. Still further, the operations section 226 indicates that the process model estimation unit is currently collecting data and is in a learn mode.

Importantly, the MPC tuning section 228 allows the user to tune the MPC controller by allowing the user to change the SP filter settings and the penalty on move variable. In particular, the user may specify, in this case at an input block 235, an SP filter factor (currently set at 2) which is to be multiplied by the process model time to steady state to determine the SP filter time constant used in the MPC controller. Additionally, a slider bar 238 allows the user to change the penalty on move variable to tune the MPC controller to thereby have a slower or a faster response characteristic. Generally speaking, the slider bar 238 may be used to specify or change a penalty on move factor which is multiplied by the default penalty on move calculated as described above with respect to the block 116 of FIG. 3. Of course, if desired, the user may be able to change the set point target vector filter and the penalty on move factor directly.

In any event, the user display screen 200 can be used by, for example, a control operator control or other user to change the tuning of the MPC controller, to update or cause a process model to be recalculated and updated based on process data selected in the area 210, to cause the MPC controller model to be updated adaptively with the most recently calculated process model, etc. Thus, the user interface screen 200 provides the user with a high degree or level of input over the adaptive updating of the MPC controller, including being able to select the robustness of the controller as defined by the SP filter factor and the penalty on move factor, to define the data to be used to generate a new process model and whether and when to update the MPC controller based on a specific process model. Of course, the adaptive MPC controller block can be completely automatic or semi-automatic in which these functions are performed automatically, periodically or at significant times, such as after a new process model has been determined. Still further, as described above, the adaptive MPC controller may perform automatic calculation of the tuning parameters based on the estimated time to steady state determined by a process model calculation, which eliminates the need to perform initial tuning, a common disadvantage of known MPC controllers. In one embodiment, the initial process model may be determined from process data and the time to steady state may be calculated therefrom, or the user may initially enter the time to steady state which may be used as described above to determine the default tuning parameters for the POM and the SP filter factor, as well as to determine the prediction horizon and the execution time for the controller. Likewise, if desired, the user may specify an initial process model to use when first setting up or running the MPC controller block.

While the adaptive MPC function block has been described and illustrated herein as having an adaptive MPC model generator located within the same function block and therefore executed in the same device as the MPC controller block, it is also possible to implement the adaptive model generator in a separate device, such as in a user interface device. In particular, the adaptive model generator may be located in a different device, such as in one of the user workstations 13 and may communicate with the MPC controller as described in conjunction with FIG. 2 during each execution or scan of the controller, during MPC controller update periods, etc. Of course, if necessary, a communication interface, such as a known OPC interface, may be used to provide the communication interface between the function block having the MPC controller therein and the workstation or other computer that implements or executes the adaptive model generator block.

Additionally, while the adaptive MPC controller block and other blocks and routines described herein have been described herein as being used in conjunction with Fieldbus and standard 4-20 ma devices, they can, of course, be implemented using any other process control communication protocol or programming environment and may be used with any other types of devices, function blocks or controllers. Although the adaptive MPC or other adaptive DMC control blocks and the associated generation and viewing routines described herein are preferably implemented in software, they may be implemented in hardware, firmware, etc., and may be executed by any other processor associated with a process control system. Thus, the routine 100 described herein or any portion thereof may be implemented in one or more standard multi-purpose CPUs or on specifically designed hardware or firmware such as, for example, ASICs, if so desired. When implemented in software, the software may be stored in any computer readable memory such as on a magnetic disk, a laser disk, an optical disk, a flash memory or other storage medium, in a RAM or ROM of a computer or processor, etc. Likewise, this software may be delivered to a user or to a process control system via any known or desired delivery method including, for example, on a computer readable disk or other transportable computer storage mechanism or may be modulated and sent over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An adaptive process controller for controlling one or more devices within a process plant, the adaptive process controller comprising:
   a controller having a prediction unit that uses a prediction model to determine a prediction signal for a set of one or more process variables, a prediction error unit that combines the prediction signal with a set point signal to produce a prediction error signal, and a combiner that multiplies the prediction error signal by a controller gain signal to produce a change in a control signal and that uses the change in the control signal to develop a control signal for controlling one of the set of process variables;
   a process model estimation unit communicatively coupled to one or more devices within the process plant to collect process data during the on-line operation of the process plant and that determines a new process model representing the operation of a portion of the process plant from the collected process data, the new process model including a set of model parameters defining characteristics of the portion of the process plant; and
   a controller adaptation unit that uses a closed form equation that expresses a new controller gain signal as a function of at least one of the set of process model parameters of the new process model to calculate the new controller gain signal and that adapts the controller to use the new controller gain signal while the controller is operating on-line to control the portion of the process plant.

2. The adaptive controller of claim 1, wherein the process model estimation unit determines a process dead time and a process time constant as elements of the set of model parameters.

3. The adaptive controller of claim 1, wherein the controller adaptation unit further determines a prediction horizon for the controller from the set of model parameters.

4. The adaptive controller of claim 1, wherein the controller adaptation unit determines a controller execution rate from the set of model parameters and provides the controller execution rate to the controller to set the execution rate of the controller during subsequent operation of the controller in controlling the portion of the process plant.

5. The adaptive controller of claim 1, wherein the controller adaptation unit determines a step response model from one or more of the model parameters, a controller execution time and a prediction horizon.

6. The adaptive controller of claim 1, wherein the controller adaptation unit determines a step response model from one or more of the model parameters, a controller execution time and a prediction horizon, the step response model including a gain vector defining a set of gains for each of a set of response times, and wherein the closed form equation expresses the new controller gain signal as a function of the set of gains of the step response model and a penalty on move.

7. The adaptive controller of claim 6, wherein the closed form equation expresses the new controller gain signal based on a control horizon equal to two controller scan periods.

8. The adaptive controller of claim 6, wherein the closed form equation expresses the new controller gain signal based on a control horizon equal to one controller scan period.

9. The adaptive controller of claim 6, wherein the closed form equation expresses the new controller gain signal based on a control horizon that is at least ten times shorter than a prediction horizon used by the controller.

10. The adaptive controller of claim 6, wherein the controller adaptation unit calculates the penalty on move as a function of one or more of the process model parameters.

11. The adaptive controller of claim 1, wherein the process model parameters include a process dead time parameter and a process gain parameter and wherein the controller adaptation unit calculates the penalty on move as a function of the process dead time parameter and the process gain parameter.

12. The adaptive controller of claim 1, wherein the controller adaptation unit develops a new prediction model from the new process model and provides the new prediction model to the controller for use in the prediction unit of the controller as the prediction model during subsequent operation of the controller.

13. The adaptive controller of claim 1, wherein the controller adaptation unit further determines a time to steady state from the process model and determines a combination of a prediction horizon and an execution rate for the controller based on the time to steady state.

14. The adaptive controller of claim 1, wherein the new controller gain signal comprises a gain vector.

15. The adaptive controller of claim 1, wherein the new controller gain signal comprises a scalar value.

16. A method of adapting a process controller that controls one or more devices to implement a process within a process plant using a prediction unit that uses a prediction model to determine a prediction signal for a set of one or more process variables, a prediction error unit that combines the prediction signal with a set point signal to produce a prediction error signal, and a combiner that multiplies the prediction error signal with a controller gain signal to produce a change in a control signal, and that uses the change in the control signal to develop a control signal for controlling the one or more devices, the method comprising:
   collecting process data during on-line operation of the process plant;
   determining, from the collected process data, a new process model including a set of model parameters that characterize the process;
   using a closed form equation that expresses a new controller gain signal as a function of at least one of the set of model parameters to calculate the new controller gain signal; and
   providing the new controller gain signal to the process controller for use as the controller gain signal in controlling a portion of the process plant during subsequent operation of the process controller.

17. The method of claim 16, wherein determining the set of model parameters includes determining a process dead time and a process time constant from the collected process data.

18. The method of claim 16, further including determining a prediction horizon from the set of model parameters.

19. The method of claim 16, further including determining a controller execution rate from the set of model parameters and wherein providing the new controller gain signal to the process controller includes providing the controller execution rate to the process controller to set the execution rate of the process controller during subsequent operation of the process controller.

20. The method of claim 16, further including determining a step response model from one or more of the set of model parameters, a controller execution rate and a prediction horizon.

21. The method of claim 16, further including determining a step response model from one or more of the set of model parameters, a controller execution rate and a prediction horizon, the step response model including a gain vector defining a set of gains for each of a set of response times, and wherein using the closed form equation to calculate a new controller gain signal includes using a closed form equation that is a function of the set of gains of the step response model and a penalty on move.

22. The method of claim 21, wherein the closed form equation has a form based on a control horizon equal to two controller scan periods.

23. The method of claim 21, wherein the closed form equation has a form based on a control horizon equal to one controller scan period.

24. The method of claim 21, wherein the closed form equation has a form based on a control horizon that is at least ten times shorter than a prediction horizon used by the process controller.

25. The method of claim 21, further including calculating the penalty on move as a function of one or more of the set of model parameters.

26. The method of claim 21, wherein the set of model parameters includes a process dead time parameter and a process gain parameter and wherein calculating the penalty on move includes calculating the penalty on move as a function of the process dead time parameter and the process gain parameter.

27. The method of claim 16, further including developing a new prediction model from the new process model and providing the new prediction model to the process controller for use in the prediction unit of the process controller as the prediction model during subsequent operation of the process controller.

28. The method of claim 16, further including determining a time to steady state from the process model and determining a combination of a prediction horizon and an execution rate for the controller based on the time to steady state.

29. The method of claim 16, wherein the new controller gain signal comprises a gain vector.

30. The method of claim 16, wherein the new controller gain signal comprises a scalar value.

31. The method of claim 16, wherein the new controller gain signal comprises a multi-dimensional matrix.

* * * * *

UNITED STATES PATENT AND TRADEMARK OFFICE
CERTIFICATE OF CORRECTION

| | | |
|---|---|---|
| PATENT NO. | : 7,856,281 B2 | Page 1 of 1 |
| APPLICATION NO. | : 12/267039 | |
| DATED | : December 21, 2010 | |
| INVENTOR(S) | : Dirk Thiele et al. | |

It is certified that error appears in the above-identified patent and that said Letters Patent is hereby corrected as shown below:

At Column 7, line 52, "the be" should be -- be the --.

At Column 17, line 23, "its" should be -- it is --.

Signed and Sealed this
Ninth Day of August, 2011

David J. Kappos
*Director of the United States Patent and Trademark Office*